United States Patent
Tseitlin et al.

(10) Patent No.: US 6,286,112 B1
(45) Date of Patent: Sep. 4, 2001

(54) METHOD AND MECHANISM FOR PROVIDING A NON-STOP, FAULT-TOLERANT TELECOMMUNICATIONS SYSTEM

(75) Inventors: Eugene Tseitlin, Buffalo Grove; Stanislav Kleyman, Chicago, both of IL (US)

(73) Assignee: Motorola, Schaumburg, IL (US)

( * ) Notice: Subject to any disclaimer, the term of this patent is extended or adjusted under 35 U.S.C. 154(b) by 0 days.

(21) Appl. No.: 09/546,669

(22) Filed: Apr. 11, 2000

(51) Int. Cl.[7] .................................................. G06F 11/20
(52) U.S. Cl. ............................................................ 714/4
(58) Field of Search ............................... 714/4–7, 13, 43, 714/55; 709/100, 224

(56) References Cited

U.S. PATENT DOCUMENTS

| | | | |
|---|---|---|---|
| 4,534,027 | * 8/1985 | Perry | 371/8 |
| 5,271,013 | * 12/1993 | Gleeson | 371/9.1 |
| 5,274,808 | * 12/1993 | Miyao et al. | 395/650 |
| 5,530,908 | 6/1996 | Rozenstrauch et al. | |
| 5,721,732 | 2/1998 | Emeott et al. | |
| 5,901,142 | 5/1999 | Averbuch et al. | |
| 6,035,419 | * 3/2000 | Breslau et al. | 714/20 |
| 6,108,701 | * 8/2000 | Davies et al. | 709/224 |
| 6,189,112 | * 2/2001 | Slegel et al. | 714/10 |

* cited by examiner

*Primary Examiner*—Robert Beausoleil
*Assistant Examiner*—Scott Baderman
(74) *Attorney, Agent, or Firm*—Jeffrey K. Jacobs

(57) ABSTRACT

A method and mechanism provide for online testing, replacement, upgrading and modification of portions of a radio communications system 100. A task controller 200 tests and replaces online elements in a task unit. The task unit is generally comprised of a task input queue 208, a task output queue 210, a subagent 204 and a task 206. The task controller 200 checks the functioning of the queues 208 and 210. If either or both are functioning improperly, the task controller 200 may replace one or both online. If both are operating properly, the task controller 200 tests the task 206. If the task 206 is improperly functioning, the task controller 206 replaces the task 206 with another task 402 online. The task controller 200may further replace tasks to upgrade portions of the system.

19 Claims, 7 Drawing Sheets

FIG 4. NEW TASK INITIALIZATION

METHOD AND MECHANISM FOR PROVIDING A NON-STOP, FAULT-TOLERANT TELECOMMUNICATIONS SYSTEM

BACKGROUND OF THE INVENTION

The present invention relates generally to a method and mechanism for providing a non-stop, fault-tolerant telecommunications system and, more particularly, to a method and mechanism which provide online testing, replacement and modification of improperly functioning portions of the system and upgrading of portions of the system.

Numerous telecommunications systems are currently available which employ sophisticated computer systems to provide services to customers. Many of these telecommunications systems operate in environments wherein the system cannot be down for any length of time. For example, emergency vehicle communications systems must remain operational during failure of portions of the system, or even the system itself.

Current systems have attempted to provide this non-stop, fault-tolerant operation by employing various methods. One common method is to provide a complete backup system. If the main system malfunctions, the main system is replaced online by the backup system. However, as is apparent, having a complete backup system is relatively expensive, occupies significant space and requires significant maintenance.

Another method for attempting to achieve non-stop, fault-tolerant operation is to provide for hardware replacement, such as board replacement and operating system upgrades in a multiprocessor environment. Unfortunately, such methods interrupt system operation and customer service.

An important feature of current communications systems is their ability to permit upgrades. Although various methods have been developed to perform system upgrades, all known methods unfortunately result in a disruption of system operation. In one method, the system is halted during an upgrade and another version of the system is started. Even though only a portion of a system is typically upgraded, the whole system is affected. Because of the various task interdependencies in current systems, eliminating (or halting) one task may result in overflows in queues, timers being expired, messages not being received and, ultimately, system crash. As those skilled in the art will readily comprehend, such problems are especially unacceptable for real-time or emergency systems.

Accordingly, there is a need in the art for a method and mechanism for providing non-stop, fault-tolerant operation of a telecommunications system that permits replacements, modifications and upgrades without interrupting operation of the system.

BRIEF DESCRIPTION OF THE DRAWINGS

The foregoing and other advantages of the invention will become apparent upon reading the following detailed description and upon reference to the drawings in which.

DETAILED DESCRIPTION OF THE PREFERRED EMBODIMENTS

The present invention provides a mechanism and method for replacing online improperly operating task units in a radio communications system and performing partial system upgrades without taking the whole system out of service. The method of the present invention includes detecting when a portion of a first task unit is improperly functioning and replacing online the portion of the first task unit with at least a portion of a second task unit. First input and output queues in the first task unit are also tested and, if improperly functioning, are replaced online. Generally, the queues are tested by sending them each a probe message and waiting for a response probe message. If no response probe message is returned, the input or output queue is replaced.

If the input and output queues are determined to be functioning properly, the invention checks the operation of a first task in the first task unit. If the first task is improperly functioning, it is replaced with a second task. In replacing the first task with the second task, the present invention first handles any messages coming into the input queue with a proper response, such as a wait message. Then the second task is started and connected to the input and output queues. The second task is tested to make sure it is functioning properly before permitting messages to be processed by the second task.

In accordance with another aspect of the present invention, a mechanism for a radio communications system comprises a task unit and a task controller. The task controller detects when at least a portion of the task unit is improperly functioning and replaces online the portion of the task unit that is improperly functioning. In particular, the task controller determines if one of the input queue, the output queue, and the first task is improperly functioning and replaces online the one of the input queue, the output queue, and the first task which is improperly functioning.

Figure 1:
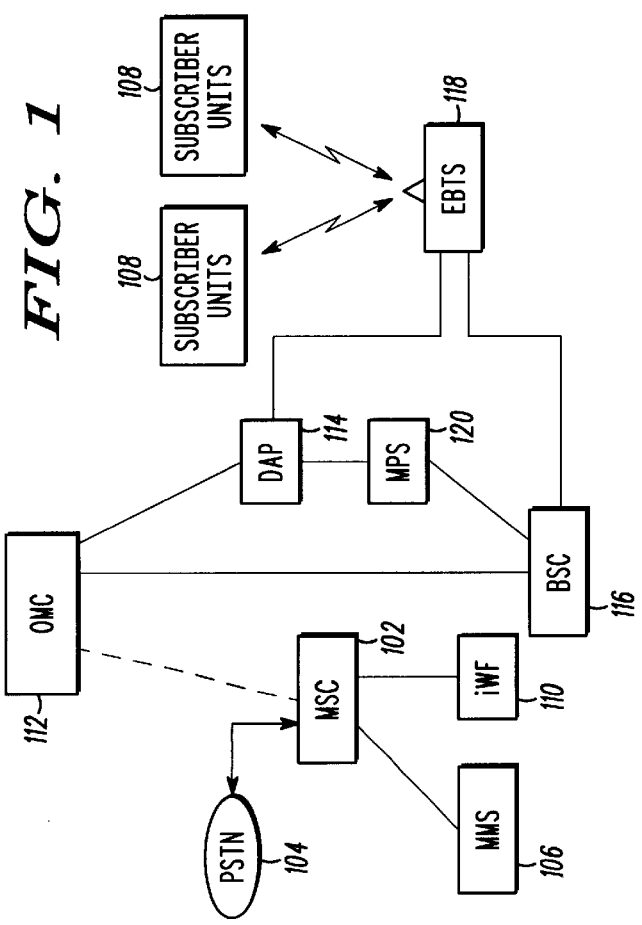
FIG. 1 is a block diagram of an exemplary radio communications system in which the present invention may be advantageously implemented.

FIG. 1 is a block diagram showing a general system configuration of a telecommunications system in which the present invention may be advantageously used. The present invention may be implemented in any number of telecommunications systems, however, the following discussion will be generally directed to use of the present invention in a wireless "iDEN" system developed by and commercially available from Motorola, Inc. of Schaumburg, IL. A more detailed discussion of the "iDEN" system may be found in commonly assigned U.S. Pat. No. 5,901,142, entitled "Method and Apparatus for Providing Packet Data Communications to a Communication Unit in a Radio Communication System" and commonly assigned U.S. Pat. No. 5,721,732, entitled "Method of Transmitting User Information and Overhead Data in a Communication Device having Multiple Transmission Modes", the disclosures of which are hereby incorporated by reference. The present invention may be advantageously implemented in any system controlled by software, such as manufacturing systems, medical systems and the like.

An exemplary system 100 based on "iDEN" in which the present invention may be advantageously implemented is shown in FIG. 1. A mobile switching center (MSC) 102 provides an interface between the system and a public switched telephone network (PSTN) 104. A message mail service (MSS) 106 connected to the MSC 102 stores and delivers alphanumeric text messages which may be transmitted to or received from subscriber units 108. An interworking function (IWF) system 110 interworks the various devices and communications in the system 100.

An operations and maintenance center (OMC) 112 provides remote control, monitoring, analysis and recovery of the system 100. The OMC 112 further provides basic system configuration capabilities. The OMC 112 is connected to a dispatch application processor (DAP) 114 which coordinates and controls dispatch communications within the system 100. A base site controller 116 controls and process transmissions between the MSC 102 and cell sites, or an enhanced base transceiver system (EBTS) 118. A metro packet switch (MPS) 120 provides one to many switching between the DAP 114 and the EBTS 118. The EBTS 118 is also directly connected to the DAP 114. The EBTS 118 transmits and receives communications with the subscriber units 108.

Figure 2:
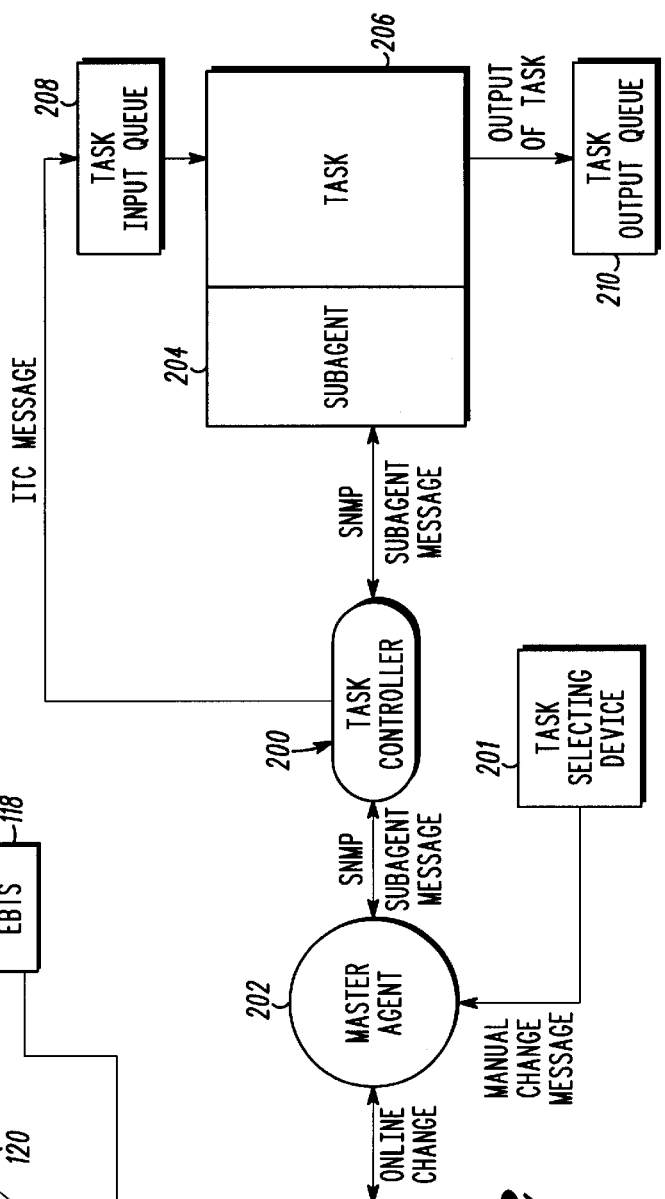
FIG. 2 is a block diagram of a system including a task controller and task unit in accordance with the present invention.

The present invention provides the capability to perform online task troubleshooting and replacement and to perform system upgrades without any system downtime. The online task replacement function is capable of being initiated by an operator or automatically when a need, or predetermined status, is detected. In a preferred embodiment of the present invention, the DAP 114, or other type processor, provides this capability through a task controller 200. The basic functionality of the task controller 200 in accordance with an aspect of the present invention will be described with reference to FIG. 2.

The task controller 200 communicates preferably through a Simple Network Management Protocol (SNMP) to a master agent 202 and a subagent 204 associated with a task 206. The DAP 114, for example, may have a single master agent which is associated with one or more tasks. The master agent 202 typically communicates with the OMC 112 on one side, and a subagent on the other side. Preferably, each task associated with a master agent has a designated subagent and task controller. A manual task selection device 201 is used to manually replace tasks online. Alternatively, as will be discussed, tasks may be automatically replaced online.

In operation, an online change request, or configuration information, from the OMC 112 is received by the master agent 202. This configuration information may be in any appropriate format, such as an ASN-1 encoded configuration file. In response thereto, the master agent 202 parses the configuration information and builds requests in SNMP format for the different subagents. During registration, each subagent identifies to its associated master agent the portion of the configuration for which it is responsible. The master agent 202 then sends the appropriate request, or subagent message, preferably in SNMP format, to the task controller 200 which is addressed to the proper subagent, such as the subagent 204. The task controller 200 detects the subagent request and in response, generates an ITC message. The ITC message contains information sufficient to inform the task 206 of the incoming subagent request and that the task 206 should invoke subagent functions to process the subagent request. The task controller 200 also relays the subagent request to the subagent 204 associated with the task 206.

The master agent 202, which may be located at the DAP 114 thereby controls the task controller 200 which, in turn, controls the task 206. The OMC 112 may contain a OMC master agent which controls the operation of the DAP master agent 202. For example, the OMC master agent may send upgrade information/procedures to the DAP master agent 202. These upgrade procedures will typically contain the possible failure scenarios and the recovery procedures for each scenario. As will be readily understood by those in the art, the description herein is directed to a specific implementation having a particular structure and element configuration for clarity and ease of description, however, the present invention may be employed in numerous structures and element configurations. For example, the master agents may be located in different structures and have different capabilities than those described herein.

The ITC message is stored in a task input queue 208 until accessed by the task 206. When the task 206 accesses the ITC message, the task 206 will invoke subagent functions to read and parse the subagent message. An output of the task 206 is sent to a task output queue 210. The task controller 200 thus analyzes and controls the operation of the task 206. The task 206, the task input queue 208 and the task output queue 210 comprise a task unit for performing certain tasks. The task input and output queues 208 and 210, the subagent 204 and the task 206 comprise a task unit.

In accordance with an aspect of the present invention, the task controller 200 provides five different areas of functionality: task initialization; regular task controller functionality; automatic online task/queue replacement; manual online task replacement and task controller replacement. Each one of these areas will now be discussed with reference to FIGS. 3–7.

Figure 3:
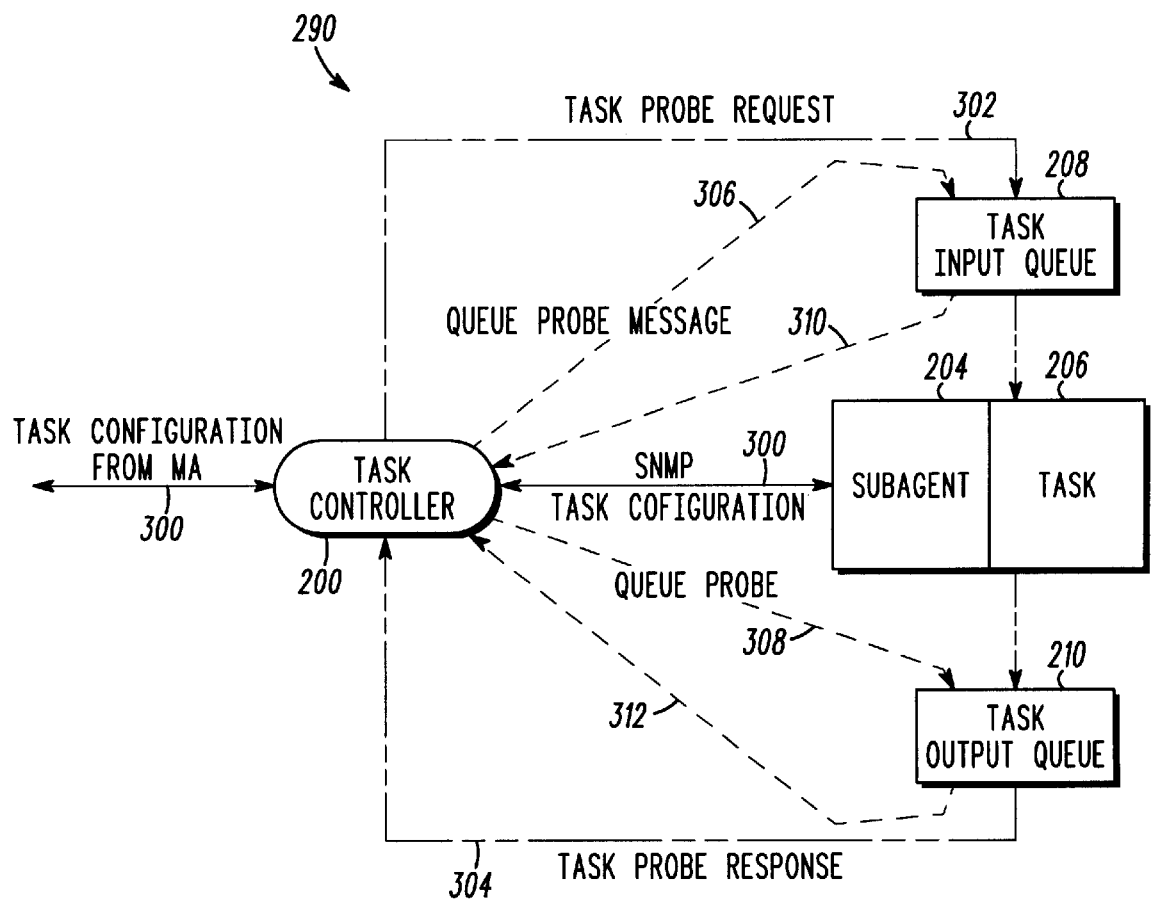
FIG. 3 is a block diagram showing an initialization procedure of the task unit.
Figure 4:
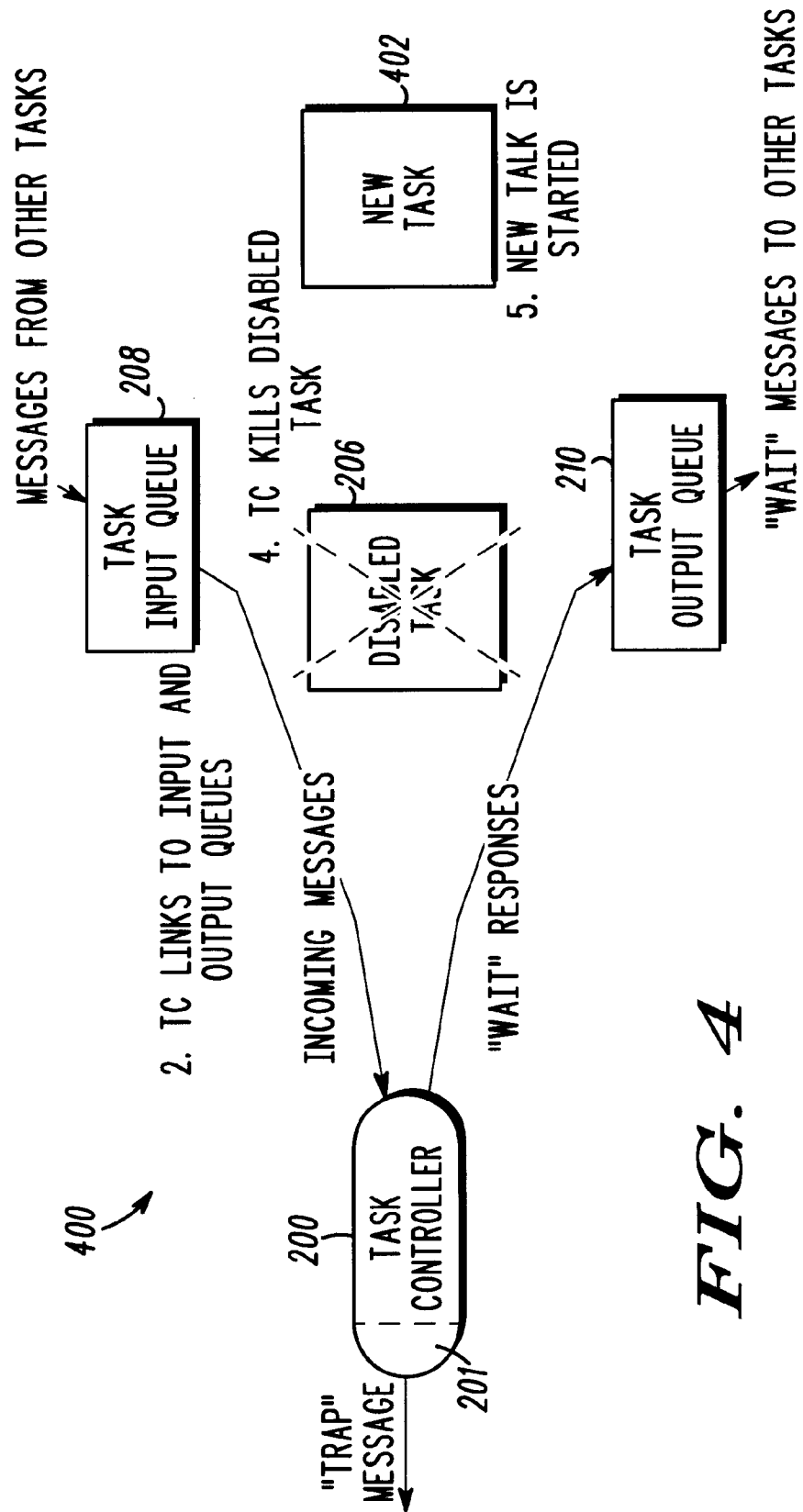
FIG. 4 is a block diagram showing a task replacement procedure.

A procedure 290 for initializing the task 206 is shown in graphical form in FIG. 3. Upon each startup, all tasks should register its associated subagent with a master agent. In the example shown, the task 206 registers the subagent 204 with the master agent 202. The master agent 202 configures the task 206 using the proper configuration information by sending a task configuration message 300 to the task controller 200. The task controller 200 passes the task configuration message 300 onto the subagent 206. The task controller 200 then tests the task 206 and its associated input and output queues 208 and 210 by sending a task probe request message 302 to the input queue 208. If the queues 208 and 210 and the task 206 are operating correctly, a task probe response message 304 will be returned to the task controller 200 and the master agent 202. The task controller 200 is preprogrammed to wait a predetermined time interval for the task probe response message 304 from the task 206. If the task controller 200 does not receive this response within this time interval, the task controller 200 then determines if the queues 208 and 210 are properly operating. This is accomplished by sending input and output queue probe messages 306 and 308 to the queues 208 and 210 and waiting for input and output return queue probe messages 310 and 312. For example, the queue probe messages 306 and 308 may have a higher priority than other messages, so that they pass right through the queues 208 and 210 and return to the task controller 200, as the input and output return queue probe messages 310 and 312.

If one or both of the return queue probe messages 310 and 312 is not detected, the task controller 200 determines that the one or both of the queues 208 and 210 is not properly operating. In such a case, the task controller 200 decides whether to replace one or both of the queues 208 and 210. Otherwise, if both queues 208 and 210 provide the return queue probe messages 310 and 312, but the task probe response message has still not been received from the task 206, the task controller 200 may try to restart the task 206.

The task controller 200 further periodically sends test probe messages to the task 206 in monitor the functional status of the task 206. This periodic "testing" occurs in a manner similar as described above with respect to the task initialization procedure 290. If the task controller 200 determines that either of the queues 208 or 210 or the task 206 are not functioning correctly, the task controller 200 initiates an online task replacement procedure.

An online task procedure 400 in accordance with one aspect of the present invention is shown in graphical form in FIGS. 4–7. By providing online task replacement, the present invention advantageously reduces down time caused by faulty tasks or caused by system interruptions due to upgrades. After determining that the task 206, for example, needs to be replaced (either due to improper operation or upgrade), the task controller 200, or more particularly, a task replacement 401, performs the following procedure. The task controller 200 first sends a trap message to the master agent 202 instructing the master agent 202 that the task 206 is being replaced.

The task controller 206 then connects to the input and output queues 208 and 210. During the replacement procedure, the task controller 206 receives incoming messages to the input queue 208 and responds to these incoming messages with a "WAIT", or hold, message sent from the output queue 210. The task controller 200 then removes, or "kills", the task 206. The task controller 200 then starts the new task 402, or now the new active task 402.

Figure 5:
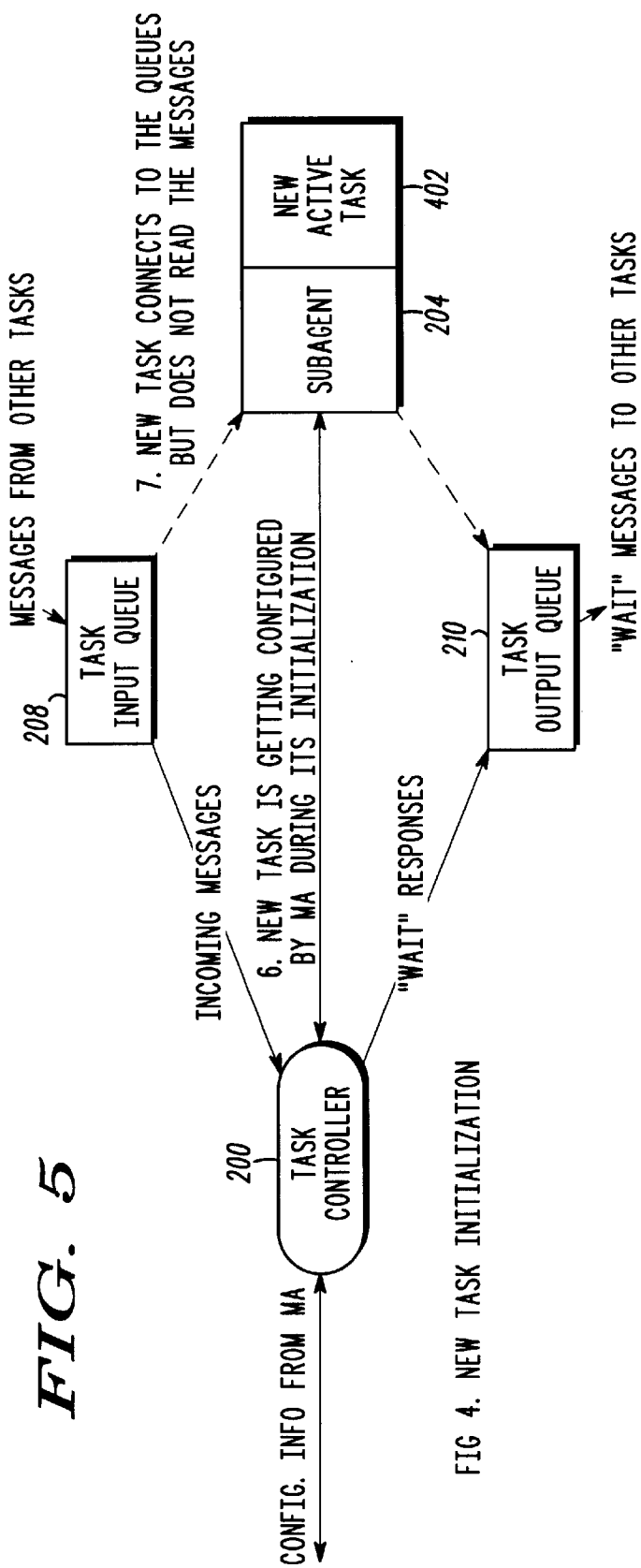
FIG. 5 is a block diagram showing an initialization procedure for a new task.

As shown in FIG. 5, the new task 402, during its initialization phase, is connected to the input and output queues 208 and 210, however, the new active task 402 does not yet read incoming messages to the input queue 208. The task controller 200 receives configuration information for the new active task 402 from the master agent 202, which it passes to the task 402.

Figure 6:
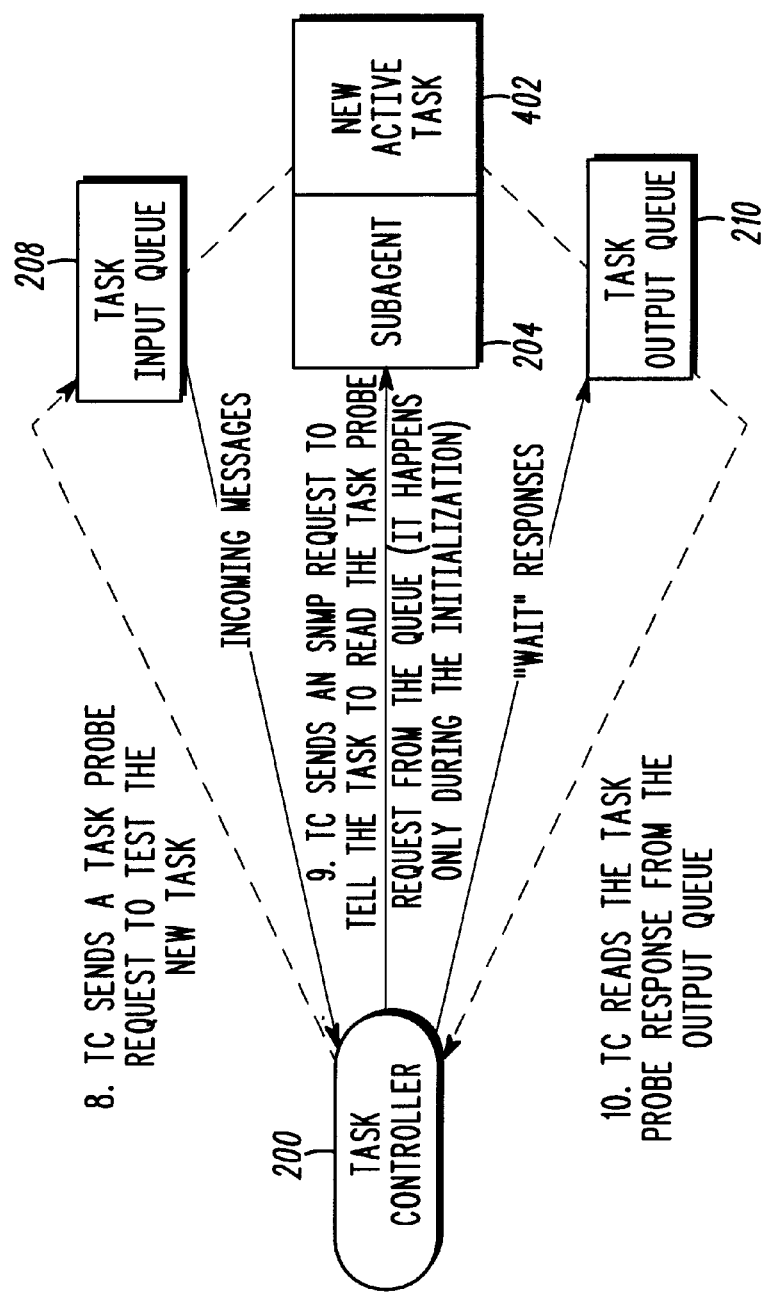
FIG. 6 is a block diagram showing a test procedure for the new task.

FIG. 6 is graphical representation of the task controller 200 testing the new active task 402. A task probe request message, similar to that discussed above with reference to the initialization of the task 204, is sent by the task controller 200 to the new active task 402 via the input queue 208. The task 402 is substantially concomitantly instructed by the task controller 200 to read the task probe request message in the input queue 208. If the task 402 is operating correctly, the task controller 200 will receive a task probe response message from the output queue 210. If the task probe response request message is not received from the output queue 210 within a preselected time period, the task controller 200 may decide to replace the task 402 and the process begins with another new task.

Figure 7:
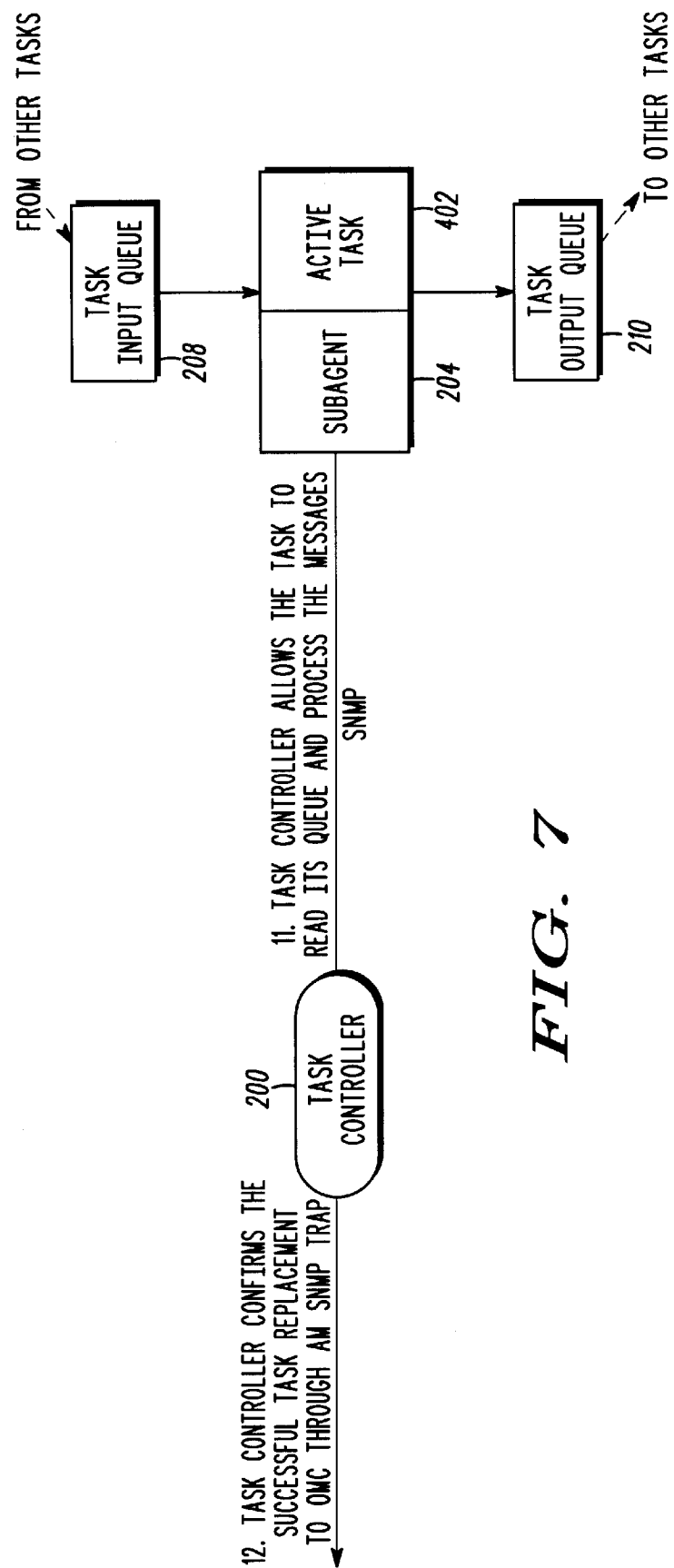
FIG. 7 is a block diagram showing a start-up procedure for the new task.

If a task probe response message is received by the task controller 200, the task controller 200 permits the new active task 402 to read the input queue 208 and process any messages, such as by starting a main program loop of the task 402, as represented in FIG. 7. The task controller 200 further confirms the successful task replacement to the task controller 200 to the OMC 112 via the master agent 202. The online task replacement process is thereby accomplished while the DAP 114 is operating and only tasks associated with the replaced task 206 are affected.

Figure 8:
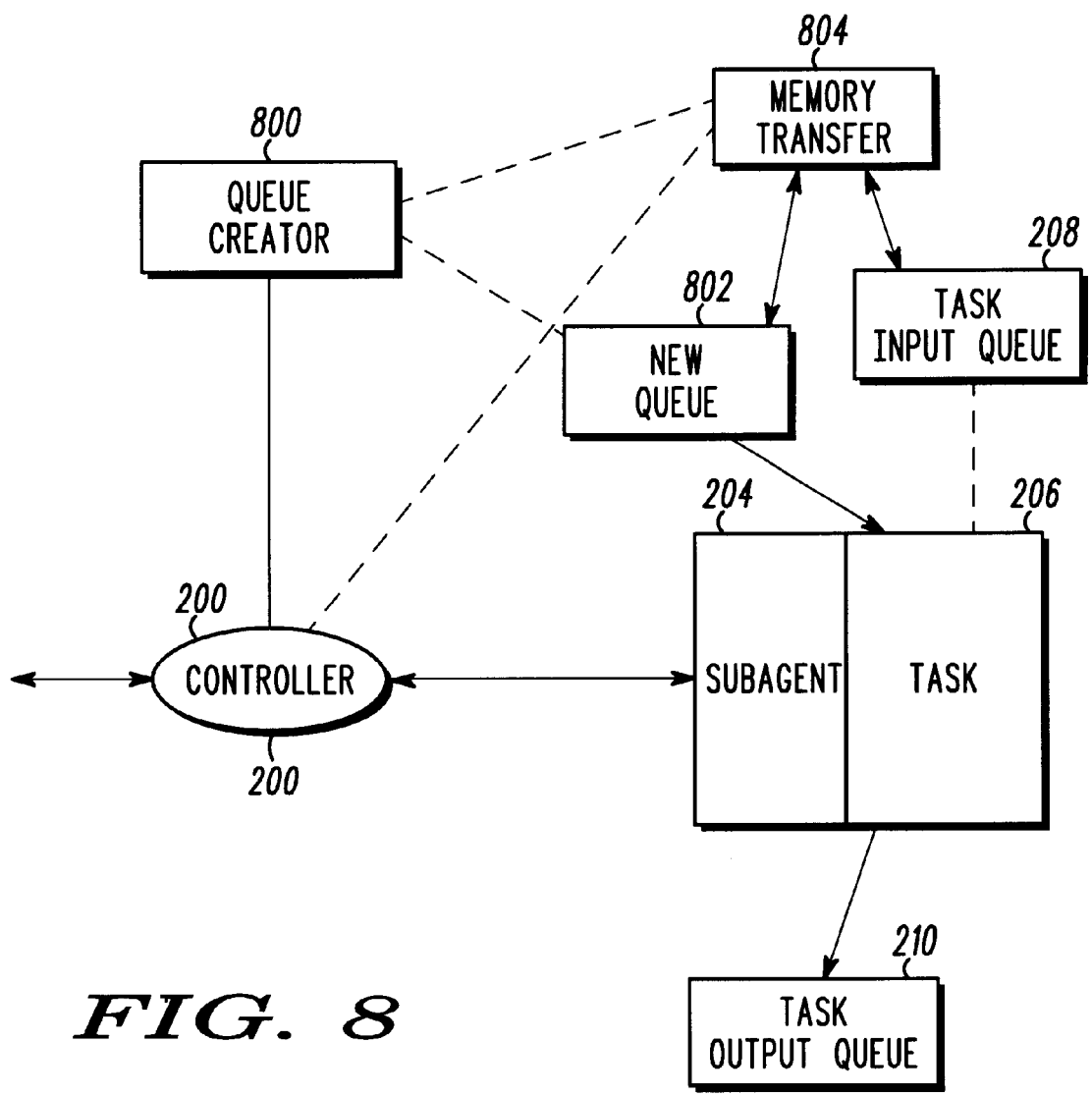
FIG. 8 is a block diagram showing an automatic queue replacement procedure.

Referring now to FIG. 8, the queues 208 and 210 may be automatically replaced online in accordance with another aspect of the present invention. If the task controller 200 detects a failure of one or more of the queues 208 or 210, the task controller 200 instructs a queue creator 800 to create a new queue 802. The task controller 200 instructs the task 206 to connect to the new queue 802 and the task controller 200 may test the new queue 802, as discussed above. In addition, a memory transfer mechanism 804 may be used to transfer information stored in the memory, or buffer, of the input queue 208 to the new queue 802. In this manner, messages already accumulated in the input queue 208 may be processed by the task 206.

In accordance with another aspect of the present invention, a manual online task replacement may be performed. Such a manual online task replacement may be performed to upgrade or downgrade the system, to re-configure task parameters which cannot be configured online, or for other purposes. An operator would select a task to be replaced using the task selection device 201, as shown in FIG. 1. The task selection device 201 may be any suitable input device, such as a computer with a touch screen or keyboard. A manual change message is sent to the master agent 202 and a replacement SNMP message is generated and sent to the task controller 200. The task controller 200 recognizes this message as a manual task replacement request and in response performs the steps described above with respect to automatic task replacement.

In accordance with another aspect of the present invention, a rollback procedure is provided. The rollback procedure would be applied where an upgrade requires the replacement of more than one task. In such a situation, if one or more of the replacements fail and the upgrade cannot operate without the failed one or more replacements, the master agent will force the task controllers which did successfully upgrade to rollback to the previous version of the tasks. Thus, the system would return to a known stable prior-to-the-upgrade state.

The master agent may provide an order, or schedule, of upgrades or replacements to be performed. And if any one or more of the replacements are not successful, the master agent will then instruct one or more of the task controllers how to continue. A specific task controller may be instructed to proceed with a fail safe procedure, such as rolling back to the previous task, discontinuing the replacement procedure or continuing with the task replacement. As will be apparent to those skilled in the art, some of the task replacements may be required before others may be performed.

For example, the master agent may determine that during a system upgrade original task1, task2, and task3 need to be replaced by replacement task1, replacement task2 and replacement task3, respectively. Because of the interrelationship between original task1, task2, task3 and the other tasks of the system, the replacements need to be done in order (task1, task2 and finally task3). Further, if replacement task1 fails, the original task1 can be reinserted (rolled back) and the replacement process can continue on to original task2. However, if either replacement task2 or replacement task3 fails, or is improperly functioning, original task1, task2, and task3 will need to be reinserted, or rolled back. Hence, in such a situation, the system returns to its original operating state. Such a fail-safe procedure assures that the system can continue to operate even though problems are encountered during the replacement procedure.

While the invention may be susceptible to various modifications and alternative forms, specific embodiments have been shown by way of example in the drawings and have been described in detail herein. However, it should be understood that the invention is not intended to be limited to the particular forms disclosed. As noted the present invention may be advantageously employed in a number of applications which use software. The invention is intended to cover all modification, equivalents and alternatives falling within the spirit and scope of the invention as defined by the following appended claims.

What is claimed is:

1. A method for replacing at least a portion of a first task unit in a communications system comprising the steps of:
   determining when the portion of the first task unit needs to be replaced; and
   replacing online the portion of the first task unit with at least a portion of a second task unit without interrupting operation of the system,
   wherein the step of determining comprises the step of detecting when the portion of the first task unit is improperly functioning,
   wherein the step of detecting comprises the steps of sending a task probe request message to the first task unit and detecting a task probe response message in response to the task probe request message,
   wherein the step of detecting a task probe response message comprises the steps of waiting a predetermined time interval for the task probe response message and determining that the portion of the first task unit is improperly functioning if the task probe response message is not detected within the predetermined time interval,
   wherein the first task unit comprises a first input queue, a first output queue and a first task, and
   wherein the step of replacing online the portion of the first task unit comprises the steps of determining which of the first input queue, the first output queue or the first task is improperly functioning and replacing the improperly functioning one of the first input queue, the first output queue and the first task.

2. The method as recited in claim 1 wherein the step of determining which of the first input queue, the first output queue or the first task is improperly functioning comprises the steps of:
   sending an input queue probe message to the first input queue requesting an input return queue probe message; and
   determining that the first input queue is improperly functioning if the input return queue probe message is not detected.

3. The method as recited in claim 2 wherein the step of replacing comprises the step of:
   automatically replacing the first input queue with a second input queue when the first input queue is determined to be improperly functioning.

4. The method as recited in claim 3 wherein the step of automatically replacing comprises the step of:
   creating the second input queue with a queue creator; and
   connecting the first task with the second input queue.

5. The method as recited in claim 4 wherein the step of determining which of the first input queue, the first output queue or the first task is improperly functioning comprises the steps of:
   sending an output queue probe message to the first output queue requesting an output return queue probe message; and
   determining that the first output queue is improperly functioning if the output return queue probe message is not detected.

6. The method as recited in claim 5 wherein the step of replacing comprises the step of:
   automatically replacing the first output queue with a second output queue when the first output queue is determined to be improperly functioning.

7. The method as recited in claim 1 wherein the step of determining which of the first input queue, the first output queue, or the first task is improperly operating comprises the steps of:
   determining whether the first input and output queues are properly functioning;
   if the first input and output queues are properly functioning, determining whether the first task is improperly functioning; and
   if the first task is improperly functioning, replacing the first task with a second task.

8. The method as recited in claim 7 wherein the step of replacing the first task comprises the steps of:
   responding to messages sent to the first input queue with a hold message;
   disconnecting the first task from the first input and output queues; and
   connecting the second task to the first input and output queues.

9. The method as recited in claim 8 wherein the step of replacing the first task comprises the step of:
   starting the second task prior to connecting the second task to the first input and output queues.

10. The method as recited in claim 9 wherein the step of replacing the first task comprises the step of initializing the second task.

11. The method as recited in claim 10 wherein the step of replacing the first task comprises the step of:
    testing the second task to determine whether the second task is functioning properly.

12. The method as recited in claim 1 wherein the step of determining when the portion of the first task unit needs to be replaced comprises the step of
    determining when the first task in the first task unit needs to be upgraded.

13. The method as recited in claim 1 wherein the step of replacing comprises the step of:
    responding to messages sent to the first input queue with a hold message;
    disconnecting the first task from the first input and output queues; and
    connecting a second task to the first input and output queues.

14. A method for replacing online one or more of a plurality of original tasks in a communications system comprising the steps of:
    determining which one or more of the plurality of original tasks needs replaced;
    determining an order in which the one or more original tasks are to be replaced;
    replacing the one or more original tasks in the determined order by holding messages sent to the original task being replaced and inserting a replacement task;
    testing each of the replacement tasks before replacing another original task; and
    executing a fail safe procedure if one or more of the replacement tasks is functioning improperly.

15. The method as recited in claim 14 wherein the step of executing a fail-safe procedure comprises the step of:
    reinserting the original task.

16. The method as recited in claim 14 wherein the step of executing a fail-safe procedure comprises the step of:
    reinserting all of the original tasks which have been replaced.

17. A mechanism for changing a communications system online comprising a task unit; and a task controller for detecting when at least a portion of the task unit is improperly functioning and for replacing online the portion of the task unit which is improperly functioning, wherein the task unit comprises an input queue, an output queue and a first task connected to the input and output queues and wherein the task controller determines if one of the input queue, the output queue, and the first task is improperly functioning and replaces online the one of the input queue, the output queue, and the first task which is improperly functioning.

18. The mechanism as recited in claim 17 wherein the task controller comprises:

a task replacement for responding to messages received by the input queue with a hold message, for disconnecting the first task from the input and output queues and for connecting a second task to the input and output queues.

19. The mechanism as recited in claim 18 wherein the task controller starts the second task and tests the second task before connecting the second task to the input and output queues.

* * * * *